UNITED STATES PATENT OFFICE.

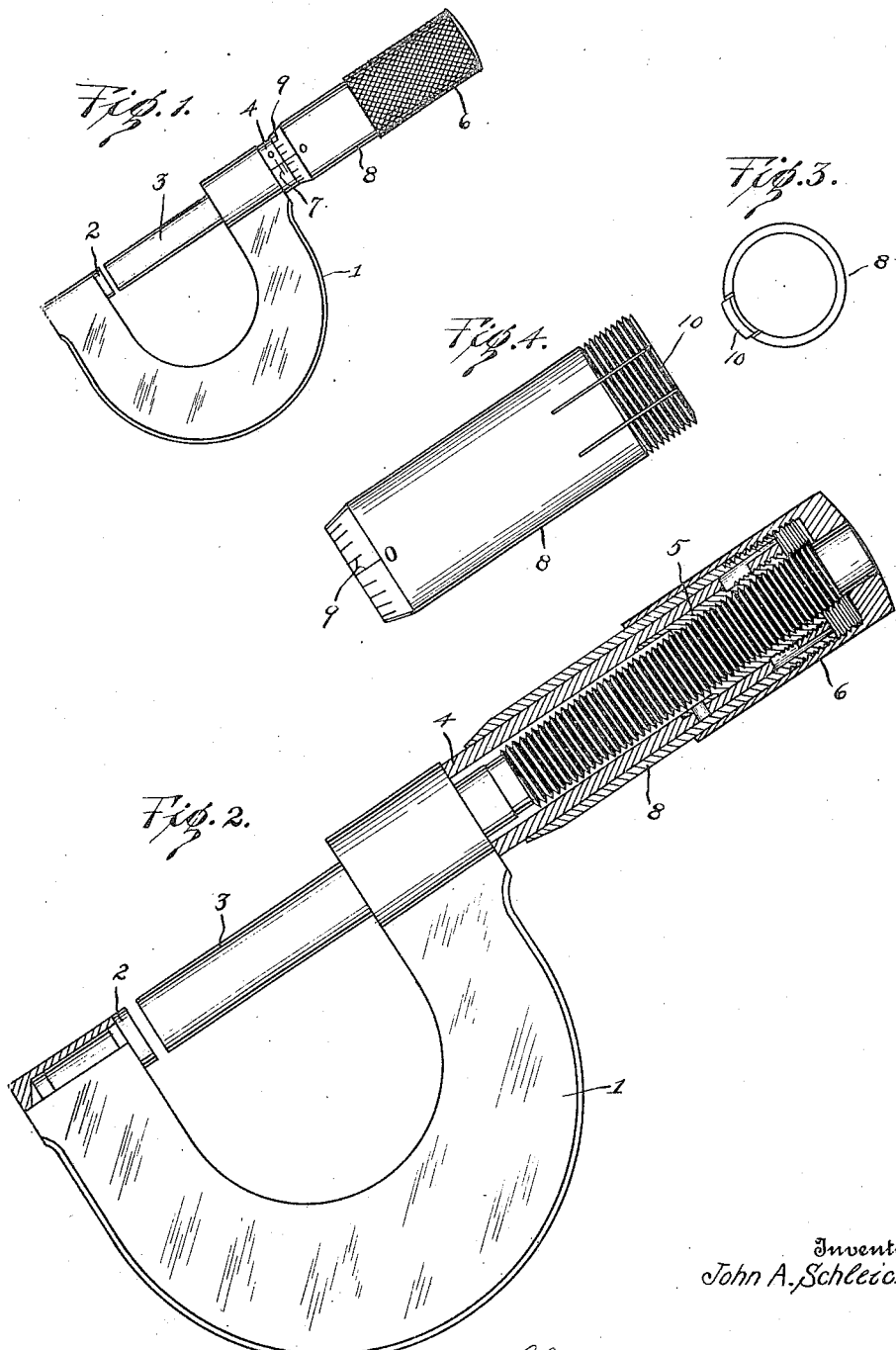

JOHN A. SCHLEICHER, OF SAGINAW, MICHIGAN, ASSIGNOR TO THE LUFKIN RULE COMPANY, OF SAGINAW, MICHIGAN, A CORPORATION OF MICHIGAN.

MICROMETER GAUGE.

1,424,383.

Specification of Letters Patent. Patented Aug. 1, 1922.

Application filed November 21, 1921. Serial No. 516,571.

*To all whom it may concern:*

Be it known that I, JOHN A. SCHLEICHER, a citizen of the United States of America, residing at Saginaw, in the county of Saginaw and State of Michigan, have invented certain new and useful Improvements in Micrometer Gauges, of which the following is a specification, reference being had therein to the accompanying drawings.

The invention relates to micrometer gauges and has for its main object the provision of a micrometer gauge having a sleeve surrounding the barrel and provided with a peripheral scale for cooperating with the longitudinal scale upon the barrel, this sleeve being normally rotatable with the thimble to longitudinally adjust the spindle but being adapted to be rotated relative to the thimble whereby the zero marks upon the scales of the barrel and sleeve can be made to register at the time the spindle and anvil are in contact with each other. Other objects of the invention reside in the novel combinations and arrangements of parts as more fully hereinafter set forth.

In the drawings:

Figure 1 is a side elevation of a micrometer gauge embodying my invention;

Figure 2 is an enlarged sectional side elevation thereof;

Figure 3 is an end view of the outer end of the sleeve;

Figure 4 is a side elevation of the sleeve.

In the present instance the micrometer gauge is a micrometer caliper although it is evident that other forms of instruments embodying my invention may be used.

1 is the U-shaped frame of the micrometer caliper, 2 the anvil and 3 the longitudinally adjustable spindle journalled in the frame 1 and extending longitudinally through the barrel 4 secured to the frame. This spindle threadedly engages the nut 5 in the barrel and is movable toward and away from the anvil by its rotation.

To rotate the spindle 3 and thereby longitudinally adjust the same toward and away from the anvil 2, there is the knurled thimble 6 secured to the outer end of the spindle 3. To obtain the reading of the distance between the anvil and spindle, the barrel 4 is provided with the longitudinally extending scale 7 and there is the sleeve 8 normally rotatable with the thimble 6 and provided with the peripheral scale 9 upon its beveled edge for cooperating with the longitudinal scale 7, both of these scales being provided with a zero mark.

In order to take up for wear on the end of the anvil, or on the spindle and nut of the micrometer caliper without adjusting the anvil, the sleeve 8 is threadedly engaged to the thimble 6 with the same pitch of thread as the threaded spindle 3 with the threaded nut 5. The sleeve 8 may be rotatably adjusted relative to the longitudinal scale and zero mark on the barrel 4 by holding the thimble 6 stationary, which is securely fastened to the spindle 3, to bring the zero marks of the scales into registration at the time the spindle 3 and anvil 2 are in contact.

In order to maintain registration of the scales, the threaded end of the sleeve 8 is split to form a tongue 10, which tends to resiliently move outwardly beyond the circumference of the sleeve as shown in Figure 3 and thereby exerts frictional resistance which is greater than that offered to the rotation of the spindle 3 in the nut 5.

What I claim as my invention is:

1. In a micrometer gauge, the combination with a frame and a barrel secured thereto, of a spindle extending through said barrel and threadedly engaged to the same, a thimble secured to said spindle and rotatable to longitudinally adjust the same in said barrel and frame, and a sleeve threadedly engaged to said thimble to be normally rotatable therewith but adapted to be rotatably adjusted relative thereto, said sleeve being threadedly engaged to said thimble with the same pitch of thread as the threaded spindle with the barrel.

2. In a micrometer gauge, the combination with a frame and a barrel secured thereto, of a spindle extending through said barrel and threadedly engaged to the same, a thimble secured to said spindle and rotatable to longitudinally adjust the same in said barrel and frame, and a sleeve threadedly engaged to said thimble to be normally rotatable therewith but adapted to be rotatably adjusted relative thereto, said sleeve being threadedly engaged to said thimble with the same pitch of thread as the threaded spindle with the barrel, and means upon said sleeve for exerting frictional resistance to maintain adjusted registration.

3. In a micrometer gauge, the combination with a frame and an anvil and barrel thereon, of a spindle journalled therein and extending through said barrel, said spindle being rotatably connected to said barrel, a thimble secured to said spindle and rotatable to longitudinally adjust said spindle toward and away from said anvil, and a sleeve surrounding said barrel and cooperating therewith to indicate the distance between said anvil and spindle, said sleeve being threadedly engaged to said thimble and having at its threaded end a resilient tongue adapted to normally occupy a position beyond the circumference of said sleeve whereby said sleeve is normally held in its adjusted position.

4. In a micrometer gauge, the combination with a frame and an anvil and barrel thereon, said barrel having a longitudinally extending scale, of a spindle journalled in said frame and extending through said barrel, a thimble secured to said spindle, a sleeve surrounding said barrel and provided with a peripheral scale for cooperating with said longitudinal scale upon said barrel, each of said scales having a zero mark, said sleeve having a threaded end rotatably adjustably engaged to said thimble and provided with a resilient tongue for normally holding said sleeve to said thimble by frictional resistance to maintain adjustment of said sleeve and thimble to register the zero marks upon said scales.

5. In a micrometer gauge, the combination with a frame and a barrel secured thereto, of a nut in said barrel, a spindle extending through said barrel and threadedly engaged to said nut, a thimble secured to said spindle and rotatable to longitudinally adjust the same in said barrel, and a sleeve threadedly engaged to said thimble to be normally rotatable therewith but adapted to be rotatably adjusted relative thereto, said sleeve being threadedly engaged to said thimble with the same pitch of thread as the threaded spindle with the nut.

In testimony whereof I affix my signature.

JOHN A. SCHLEICHER.